United States Patent [19]
Perry et al.

[11] 3,848,664
[45] Nov. 19, 1974

[54] HEATING/COOLING APPARATUS

[75] Inventors: Edward James Perry, Ickenham; Paul Moumouloff, London, both of England

[73] Assignee: Kins Developments Limited, London, England

[22] Filed: June 23, 1972

[21] Appl. No.: 265,454

[30] Foreign Application Priority Data
June 23, 1971 Great Britain.................... 29495/71

[52] U.S. Cl...................... 165/22, 165/26, 165/30
[51] Int. Cl............................................. F24f 3/00
[58] Field of Search.............. 165/22, 50, 26, 27, 30

[56] References Cited
UNITED STATES PATENTS
2,492,757  12/1949  Meek.................................. 165/22

*Primary Examiner*—Charles Sukalo
*Attorney, Agent, or Firm*—Watson, Cole, Grindle & Watson

[57] ABSTRACT

Heating/cooling apparatus includes a heating circuit for re-circulating heated fluid to a heating device, a cooling circuit for re-circulating cooled fluid to a cooling device, the flow path in the cooling circuit being separate from the flow path in the heating circuit, refrigeration unit for cooling the cooled fluid and heating the heated fluid, first heat exchanger selectively operable for removing unwanted heat from the heating circuit when not required by the heating device, and second heat exchanger selectively operable for adding heat to the fluid in the cooling circuit when insufficient heat is added at the cooling device.

13 Claims, 2 Drawing Figures

HEATING/COOLING APPARATUS

BACKGROUND OF THE INVENTION

The invention relates to heating/cooling apparatus having a heating system for heating fluid and a cooling system for cooling fluid. Such apparatus may for example be used for air conditioning or in process plants where heating and cooling are both required.

The heating/cooling apparatus may include a heating circuit and a cooling circuit both linked to the same refrigeration cycle. The heat withdrawn from the refrigerant by the heating circuit should balance the heat put into the refrigerant by the cooling circuit. However, the amount of heating required will not always balance the amount of cooling required. Consequently, some form of control must be imposed on the heating and cooling circuits to achieve the desired operating conditions.

The present invention is concerned with the provision of heating/cooling apparatus which is particularly flexible in its operating conditions and economical to run.

SUMMARY OF THE INVENTION

The present invention provides heating/cooling apparatus including a heating circuit for re-circulating heated fluid to a heating device, a cooling circuit for re-circulating cooled fluid to a cooling device, the flow path in the cooling circuit being separate from the flow path in the heating circuit, refrigeration means for cooling the cooled fluid and heating the heated fluid, first heat exchange means selectively operable for removing unwanted heat from the heating circuit when not required by the heating device, and second heat exchange means selectively operable for adding heat to the fluid in the cooling circuit when insufficient heat is added at the cooling device.

When the heating device requires more heat than is being provided by the heating circuit, it may be desirable to increase the temperature of the fluid in the cooling circuit returning to the refrigeration means. Preferably the means for adding heat to the fluid in the cooling circuit is controlled by a temperature sensitive device in part of the heating circuit so that the temperature of the cooled fluid returning to the refrigeration means may be raised when the temperature of the heated fluid in that part of the heating circuit falls below a required level.

Conveniently, the heating device and cooling device may comprise heating and cooling coils over which fluid may flow in order to be heated or cooled. When used in air conditioning apparatus, the fluid passing over the coils will be air and the air may flow over the coils in succession so that moisture is removed by the cooling coils and the air subsequently reheated by the heating coils.

Preferably the means for removing heat from the heating circuit and means for adding heat to the cooling circuit each comprise a heat exchange device through which flows a heat sink fluid. Preferably the heat exchange devices for both the heating and cooling circuits are connected to a common heat sink circuit.

DESCRIPTION OF THE PREFERRED EMBODIMENT

Figure 1:
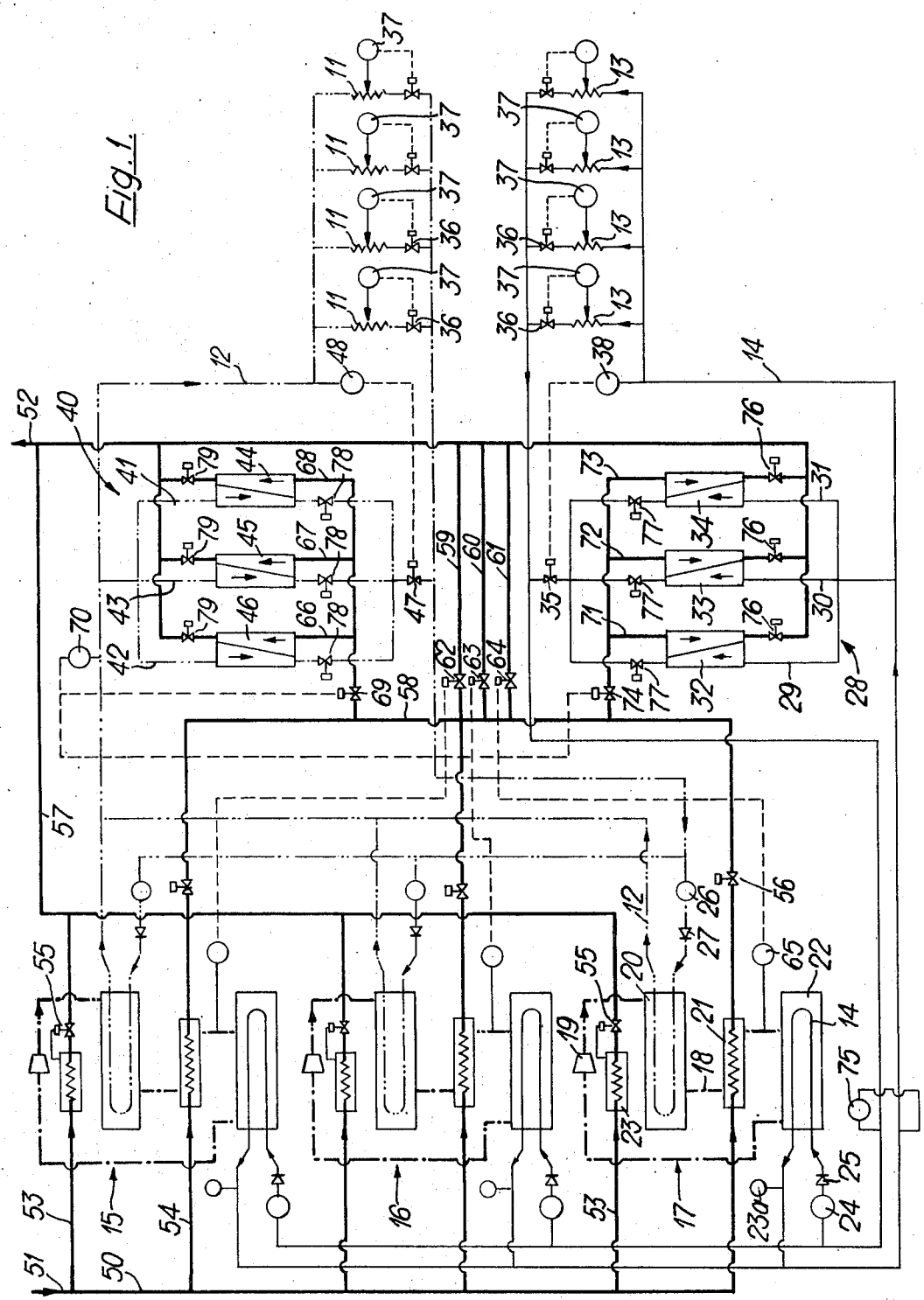
FIG. 1 is a schematic flow diagram of an air conditioning system.

In FIG. 1, the apparatus includes four heating coils 11, connected in parallel, and heated by a heating circuit 12. Four parallel connected cooling coils 13 are also provided and cooled by a cooling circuit 14. The heating and cooling circuits are both coupled to three refrigeration units 15, 16 and 17. As the refrigeration devices are all similar and similarly connected, only unit 17 will be described in detail. This comprises a closed loop refrigerant path 18 around which refrigerant is recycled by a compressor 19. The refrigerant path passes through a condenser 20, sub-cooling heat exchange device 21 and evaporator 22. An oil cooler 23 is provided for cooling the lubricant of the compressor 19. The heating circuit 12 passes through the condenser 20 so as to receive heat from the refrigerant. The cooling circuit 14 passes through the evaporator 22 so as to be chilled by the refrigerant. The exit temperature of the chilled water from the evaporator 22 is controlled by a temperature controller 23a which is used to actuate the unloading mechanism within the compressor 19. The flow of cold water through each evaporator 22 is controlled by a pump 24 and one way valve 25 provided on the inlet side of the evaporator 22. Similarly, the flow of warm water through the condenser 20 is controlled by a pump 26 and one way valve 27 on the inlet side of the condenser 20.

The cooling circuit 14 includes a bypass circuit 28 in parallel with the cooling coils 13. The bypass circuit includes three parallel paths 29, 30 and 31 passing through three plate heat exchangers 32, 33 and 34 and controlled by a common valve 35. The heating coils 11 and cooling coils 13 are mounted in air handling units so that air may flow through the units in a direction opposite to the flow of water through the coils. The flow of heated and chilled water through the coils 11 and 13 can in each case be controlled by valves 36 which incorporate temperature controllers 37 situated in the air stream. The temperature controllers 37 can be preset to a desired air temperature so that the flow through the coils 11 and 13 is automatically adjusted to suit the preset air temperature. A pressure controller 38 is provided in the cooling circuit 14 near the coils 13 and is arranged to control the valve 35 in the bypass circuit in dependence on the pressure of chilled water in the circuit adjacent the coils 13.

Similarly, a bypass circuit 40 is provided in the heating circuit 12 in parallel with the heating coils 11. The bypass circuit 40 includes three parallel arms 41, 42 and 43, each passing through a plate heat exchanger 44, 45 and 46. A common control valve 47 controls flow through the bypass circuit in dependence on a pressure controller 48 located in the heating circuit 12 adjacent the heating coils 11. The pressure controller 48 controls the bypass circuit 40 in the same way as the pressure controller 38 controls the bypass circuit 28.

As will be seen from FIG. 1, the heating circuit 12 and cooling circuit 14, which are each marked by a characteristic line in the drawing, provide separate closed loop paths around which heating water and chilled water are recirculated by the pumps 26 and 24. The flow paths in the heating circuit and cooling circuit are isolated from each other.

A heat sink circuit 50 is also provided and is marked by a continuous thick line in FIG. 1. This circuit comprises a water flow system having an inlet 51 and an outlet 52. The inlet 51 is connected to two parallel paths 53 and 54 passing through each refrigeration unit. The path 53 passes through the oil cooler 23 and is controlled by a valve 55. The path 54 flows through the subcooler 21 and is controlled by a valve 56. The paths 53 from each refrigeration unit are connected via a line 57 to the outlet 52. The paths 54 are connected to a common pipe 58 which is linked to the outlet 52 by three alternative paths. The first of these paths consists of three parallel pipes 59, 60 and 61 each controlled by a respective valve 62, 63 and 64. Each of these valves is controlled by a temperature controller 65 in one of the refrigeration units 15, 16 and 17, which responds to the temperature of refrigerant on the outlet side of the sub-cooler 21. The second path for the heat sink water from the pipe 58, is through three parallel pipes 66, 67 and 68 passing through the three heat exchangers 46, 45 and 44 respectively. Flow through these paths is controlled by a valve 69 arranged to be operated by a temperature controller 70 positioned in the heating circuit 12 on the outlet side of the condensers 20. The third alternative path for the heat sink fluid, is through three parallel pipes 71, 72 and 73 passing through the three heat exchangers 32, 33 and 34. Flow through these pipes is controlled by a valve 74 operated by the temperature controller 70.

A differential temperature controller 75 is positioned between the flow and return lines to the refrigeration units in the cooling circuit 14. This controller 75 is used to cut out successive refrigeration units 15, 16 and 17 as the required duty of the apparatus decreases. Separate flow control valves 76, 77, 78 and 79 are provided on the flow paths through the heat exchangers 44, 45, 46, 32, 33 and 34. In this way, the paths through the heat exchangers can be opened or closed to suit the number of refrigeration units which are operating at any particular time.

The operation of the apparatus is as follows. Refrigerant is recycled around the path 18 so that water flowing around the heating circuit 12 is heated and water flowing around the cooling circuit 14 is chilled. Initially the valves 35 and 47 are closed so that all the chilled water flows through the cooling coils 13 and all the heated water flows through the heating coils 11. In this way, air flowing over the coils is cooled by the coils 13 and may thereby have its moisture removed. If this same air is then passed over the coils 11, it may be heated to an acceptable temperature. If the temperature controllers 37 on the cooling coils 13 indicate that less cooling is required, the valves 36 are adjusted to reduce flow through the coils 13. The pressure controller 38 thereby detects an increase in pressure in the chilled water circuit and opens the valve 35 to allow some chilled water to flow through the bypass circuit 28 back to the evaporators 22. Normally, the valve 74 is closed so that at this time, no flow is occurring through the heat sink pipes 71, 72 and 73. In a similar way, if the temperature controllers 37 on the heating coils 11 indicate that less heat is required, the valves 36 in series with the coils 11 are progressively closed and the pressure build-up detected by the detector 48 opens the valve 47 to allow some of the heated water to pass through the bypass circuit 40 back to the condensers 20. If the temperature on the discharge side of the condensers 20 continues to rise above an acceptable limit, the temperature controller 70 will detect this temperature rise and open the valve 69. This allows flow of the heat sink water through the heat exchangers 44, 45 and 46 and causes removal of heat from the heating circuit 12 before the heated water returns to the condensers 20. If on the other hand, the temperature detected by the detector 70 falls below a required level, the controller 70 causes the valve 74 to be opened. This permits flow of heat sink water through the heat exchangers 32, 33 and 34. This heat sink fluid thereby adds heat to the chilled water before returning to the evaporators 22. This raises the temperature of chilled water returning to the evaporators and thereby affects the refrigeration cycle in such a way as to cause additional heating of the hot water leaving the condensers 20.

It will thereby be seen that the flow of heat sink fluid under the control of the selectively operable valves 69 and 74, provides a way of removing unwanted heat from the heating circuit and adding additional heat to the cooling circuit when required.

When the valves 69 and 74 are closed, the flow of heat sink fluid through the sub-coolers 21 can be permitted by opening the valves 62, 63 and 64. These valves are controlled in dependance on the temperature of refrigerant leaving the sub-coolers 21 so that when cooling is needed in the sub-coolers, the valves 62, 63 and 64 will be opened to allow flow of heat sink water to maintain cooling in the sub-coolers 21.

The overall duty of the apparatus can be modulated by control of the compressors 19. On reducing the duty, the refrigerant mass flow of all the compressors is progressively reduced to about 60 percent load and at that point, one refrigeration unit is switched off completely and the other two returned to full load. On further reduction, the two remaining compressors are reduced to 45 percent load until a second compressor is switched off and the remaining compressor works at full load. This again can be progressively reduced. It will be seen that each evaporator 22 is provided with its own flow pump 24. In this way, when the compressor of a particular refrigeration unit is switched off, the pump 24 of the associated evaporator is simultaneously switched off to stop flow through that evaporator. In this way, flow of chilled water only occurs through those evaporators of refrigeration units which are still working. This avoids the problem of different water temperatures from the various evaporators 22 flowing back into the main cooled water circuit 14. When particular refrigeration units are shut down, it is desirable to close some of the valves controlling the heat exchangers 32, 33, 34, 44, 45 and 46 so that the velocity of water through the heat exchangers continues to run at a velocity providing good efficiency.

It will be seen that the above described apparatus provides great flexibility of control and simplicity of construction. The refrigeration units 15, 16 and 17 may each be provided as a unit package and the number of these can be increased or decreased to suit the duty of the overall system. Variable heating can be achieved at the same time as variable chilling and there is no mixing of the hot and chilled water circuits. The provision of the sub-coolers 21 in the refrigeration units gives the advantage of needing lower mass flow rate of refrigerant to retain the same duty. Although not shown in the drawing, a pressure reducing valve is provided in the refrigerant circuit between each sub-cooler 21 and evaporator 22.

The invention is not restricted to the details of the foregoing example. For example, although it is particularly convenient to use a common heat sink water circuit for removing unwanted heat from the heating circuit 12 and adding additional heat to the cooling circuit 14, other means may be used to achieve this effect in both the hot water circuit and in the chilled water circuit. Furthermore, whatever means is used to achieve this effect, it need not act on the bypass circuits 28 and 40 in parallel with the cooling coils 13 and heating coils 11. The additional heat may be added to the cooling circuit 14 in series with the coils 13 and simlarly unwanted heat may be removed from the heating circuit 12 in series with the coils 11. The provision of the bypass circuits 28 and 40 shown in the drawings gives the advantage of constant flow rate around the heating circuit 12 and cooling circuit 14 regardless of the setting of the valves in series with the coils 11 and 13.

The system could use air as a heat sink instead of water, by employing air cooled or air heated heat exchangers in the heat sink circuits. The heat can be augmented by ducting the exhaust air from the building to the heat exchanger to utilize the building waste heat. A further heat exchanger can be inserted to absorb the motor heat of the installation and at the same time provide cooling for the engine room.

The cooling circuit 14 instead of using chilled water could use refrigerant. In this case the cooling of the air within the air handling units adjacent the coils 13 could be achieved by circulating liquid refrigerant in a subcooled state and at a pressure so that vaporisation does not occur within the cooling coil. The liquid refrigerant would be vaporised and then compressed and condensed in a normal refrigerant cycle. This method of effecting cooling eliminates the heat transfer surface within the evaporators 22 and improves the thermal efficiency of the installation.

The temperature controller 70 may be linked to the valves 36 so that when all the heating requirements are satisfied and the valves 36 are progressively closed, the temperature setting of the temperature controller 70 is reduced. In this way, more heat sink water is passed so as to reduce the temperature of the hot water returning to the condensers and thereby lower the condensing temperatures in the condensers. When the condensing temperature is reduced, the refrigerant does not need to be pumped around at the same pressure and this reduces the power needed for driving the compressors 19. It also provides more efficient operation as the refrigerant circulates with a higher mass flow rate.

Figure 2:
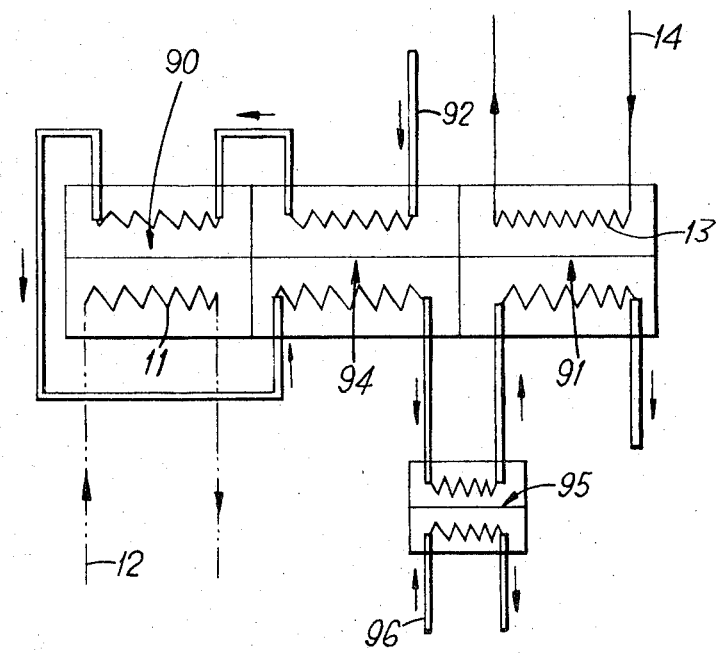
FIG. 2 shows a modification of part of the apparatus of FIG. 1 for use in pasteurising milk.

Although the above example has been described as air conditioning apparatus, the heating/cooling apparatus according to the invention has other applications. For example, it can be used for straightforward heating or cooling of ventilating air. It can also be used in various process plants where it is necessary to heat and cool fluids. For example, it can be used in the pasteurisation of milk where heating and cooling take place simultaneously. Such an arrangement is shown in FIG. 2. In this case, the coils 11 supplied by the hot water circuit 12 form part of a heat exchanger 90 through which incoming milk passes and is heated by the hot water circuit. The coils 13 connected in the cooling circuit 14 form part of a heat exchanger 91 where the milk is cooled by the chilled water before leaving the plant.

The incoming milk flowing along pipe 92 is preheated in a heat exchanger 94 before passing through the heat exchanger 90 in the hot water circuit. After passing through the heat exchanger 90 where the milk may be heated to for example, 162°F, the milk passes back through the heat exchanger 94 where some heat is given up to the incoming milk. The cooling milk then flows through a further heat exchanger 95 where additional cooling is achieved by a cold water current 96. Finally the milk passes through the heat exchanger 91 where it is further cooled to for example 40°F by the cold water circuit 14. The heating and cooling circuits 12 and 14 shown in FIG. 2 form part of a system similar to that of FIG. 1 and operation of the plant to adjust the amount of heating and cooling is substantially the same as already described with reference to FIG. 1. Water for the heat sink circuit may be provided by a well or a river.

We claim:

1. Heating and cooling apparatus including a heating device, a heating circuit for recirculating heated fluid to the heating device, a cooling device, a cooling circuit for recirculating cooled fluid to the cooling device, the flow path in the cooling circuit being separate from the flow path in the heating circuit, refrigeration means for cooling the cooled fluid and heating the heated fluid, first heat exchange means selectively operable for removing unwanted heat from the heating circuit when not required by the heating device, and second heat exchange means selectively operable for adding heat to the fluid in the cooling circuit when insufficient heat is added at the cooling device.

2. Heating/cooling apparatus as claimed in claim 1 in which the means for adding heat to the fluid in the cooling circuit is controlled by a temperature sensitive device in part of the heating circuit so that the temperature of the cooled fluid returning to the refrigeration means may be raised when the temperature of the heated fluid in that part of the heating circuit falls below a required level.

3. Heating/cooling apparatus as claimed in claim 1 in which the means for removing heat from the heating circuit and means for adding heat to the cooling circuit each comprise a heat exchange device through which flows a heat sink fluid.

4. Heating and cooling apparatus as claimed in claim 3 further including a heat sink circuit for said heat sink fluid, the heat exchange devices for both the heating and cooling circuits being connected to said heat sink circuit.

5. Heating/cooling apparatus as claimed in claim 4 in which the fluid used in each circuit is water.

6. Heating/cooling apparatus as claimed in claim 1 in which the heating circuit and cooling circuit each include two parallel paths, the heating or cooling device being provided in one path and the means for removing or adding heat being arranged to operate on the parallel path.

7. Heating/cooling apparatus as claimed in claim 6 in which valve means is provided for adjusting the flow rates through each said one path to control the heating or cooling effected by the heating device and cooling device, and valve means is provided in each said parallel path and controlled by a pressure controller in said one path.

8. Heating/cooling apparatus as claimed in claim 1 in which the refrigeration means includes a closed loop of recycled refrigerant passing through a condenser coupled to the heating circuit and an evaporator coupled to the cooling circuit.

9. Heating/cooling apparatus as claimed in claim 2 in which the setting of the temperature sensitive device in the heating circuit is adjustable to alter the condensing temperature within the refrigerant cycle.

10. Heating/cooling apparatus as claimed in claim 4 in which the refrigerant is cooled on passing from the condenser to the evaporator by a heat exchange device through which the said heat sink fluid passes.

11. Heating/cooling apparatus as claimed in claim 8 in which a plurality of selectively operable refrigeration means are coupled in parallel to the heating and cooling circuits for adjusting the duty of the air conditioning apparatus.

12. Heating/cooling apparatus as claimed in claim 11 in which the compressors for each refrigerant cycle can be selectively switched off, and a separate pump for cycling the cooling fluid is provided for each evaporator so that when any compressor is switched off to reduce the duty, the pump of the associated evaporator is also switched off to stop flow of cooling fluid through the evaporator.

13. Air conditioning apparatus comprising heating/cooling apparatus as claimed in claim 1 arranged so that air may flow over the said heating and cooling devices.

* * * * *